(12) United States Patent
Mise

(10) Patent No.: US 8,831,363 B2
(45) Date of Patent: Sep. 9, 2014

(54) PATTERN RECOGNITION APPARATUS AND PROCESSING METHOD THEREOF

(75) Inventor: Ryoko Mise, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 12/778,964

(22) Filed: May 12, 2010

(65) Prior Publication Data

US 2010/0296740 A1    Nov. 25, 2010

(30) Foreign Application Priority Data

May 19, 2009   (JP) ................................. 2009-121349

(51) Int. Cl.
    *G06K 9/00*     (2006.01)
    *G06K 9/68*     (2006.01)
    *G06E 1/00*     (2006.01)
    *G06K 9/62*     (2006.01)

(52) U.S. Cl.
    CPC ........ *G06K 9/00248* (2013.01); *G06K 9/00986* (2013.01); *G06K 9/6257* (2013.01)
    USPC .............................. 382/226; 382/118; 706/20

(58) Field of Classification Search
    USPC ..................................... 382/226, 118; 706/20
    See application file for complete search history.

(56) References Cited

U.S. PATENT DOCUMENTS

| | | | | |
|---|---|---|---|---|
| 5,373,400 A | * | 12/1994 | Kovacs ............................ | 360/46 |
| 5,819,247 A | * | 10/1998 | Freund et al. .................... | 706/25 |
| 6,292,594 B1 | * | 9/2001 | Iwai ................................ | 382/298 |
| 7,624,076 B2 | * | 11/2009 | Movellan et al. ............... | 706/12 |
| 7,689,034 B2 | * | 3/2010 | Terakawa ....................... | 382/159 |
| 7,844,108 B2 | * | 11/2010 | Sabe et al. ..................... | 382/159 |
| 7,890,443 B2 | * | 2/2011 | Zhang et al. ..................... | 706/45 |
| 7,903,870 B1 | * | 3/2011 | Budagavi ....................... | 382/162 |
| 8,015,132 B2 | * | 9/2011 | Xu ................................... | 706/20 |
| 2003/0113030 A1 | * | 6/2003 | Kimura et al. ................ | 382/247 |
| 2005/0102246 A1 | * | 5/2005 | Movellan et al. ............... | 706/12 |
| 2007/0112701 A1 | * | 5/2007 | Chellapilla et al. ............. | 706/15 |
| 2007/0217688 A1 | * | 9/2007 | Sabe et al. ..................... | 382/226 |
| 2008/0235165 A1 | * | 9/2008 | Movellan et al. ............... | 706/12 |

(Continued)

FOREIGN PATENT DOCUMENTS

| | | | |
|---|---|---|---|
| JP | 03-142685 A | 6/1991 | |
| JP | 04-123276 A | 4/1992 | |

OTHER PUBLICATIONS

P. Viola, et al., "Robust Real-time Object Detection", Second International Workshop on Statistical and Computational Theories of Vision, pp. 1-25 (Jul. 2001).

(Continued)

*Primary Examiner* — Kathleen Y Dulaney
(74) *Attorney, Agent, or Firm* — Fitzpatrick, Cella, Harper & Scinto

(57) ABSTRACT

Pattern matching of a plurality of stages that refer to respectively different parameters at each stage is performed with respect to each of a plurality of input data in sequence from a first stage until a matching result is false. A parameter referred to in pattern matching from a first stage until a predetermined stage among pattern matching of the plurality of stages is fixedly held in a fixed parameter holding unit. A parameter referred to in pattern matching of a stage after the predetermined stage is rewritably held in a variable parameter holding unit. In accordance with progress of pattern matching of the plurality of stages, a parameter held in the variable parameter holding unit is rewritten with an unheld parameter.

7 Claims, 12 Drawing Sheets

(56) References Cited

U.S. PATENT DOCUMENTS

2008/0247598 A1* 10/2008 Movellan et al. ............. 382/100
2009/0324060 A1* 12/2009 Sato et al. .................... 382/159
2010/0042561 A1* 2/2010 Abe et al. ....................... 706/12
2010/0177957 A1* 7/2010 Ogawa ........................ 382/160

OTHER PUBLICATIONS

Japanese Office Action dated Mar. 22, 2013, concerning Japanese Patent Application No. 2009-121349.

* cited by examiner

FIG. 8
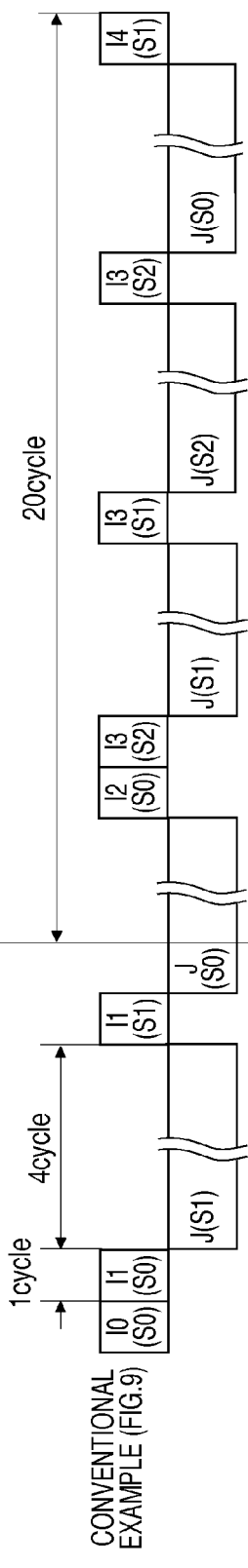
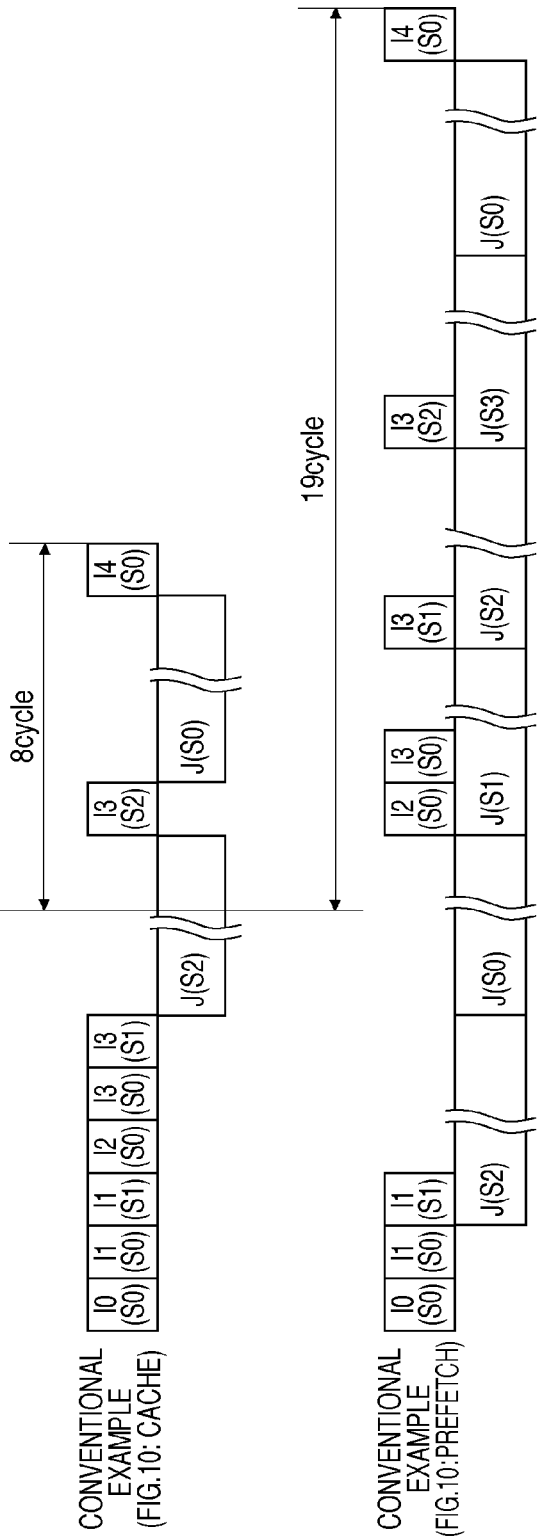

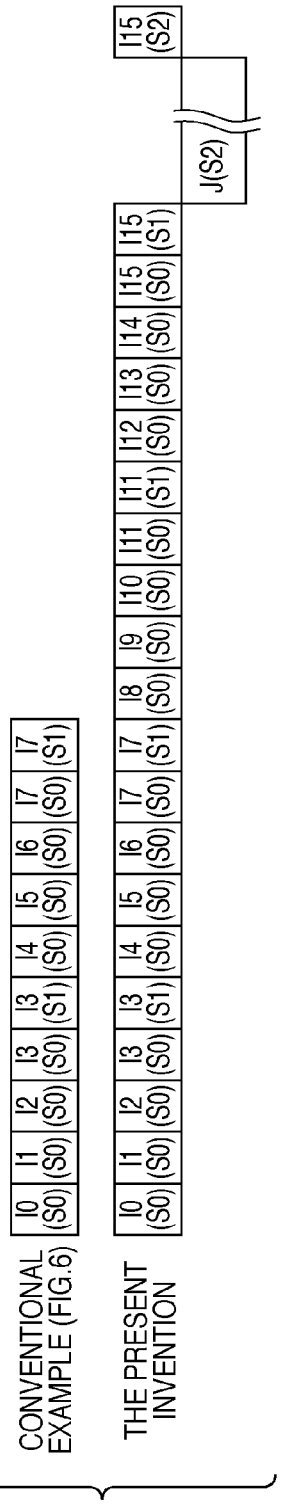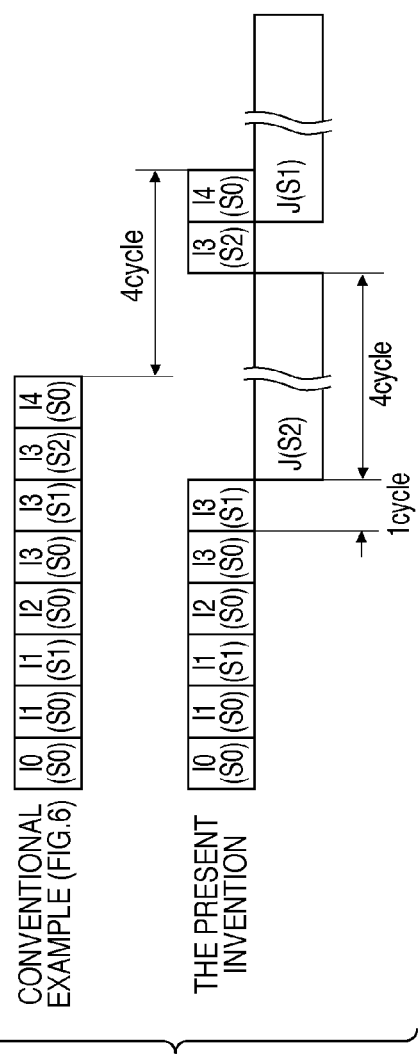
FIG. 12A
FIG. 12B

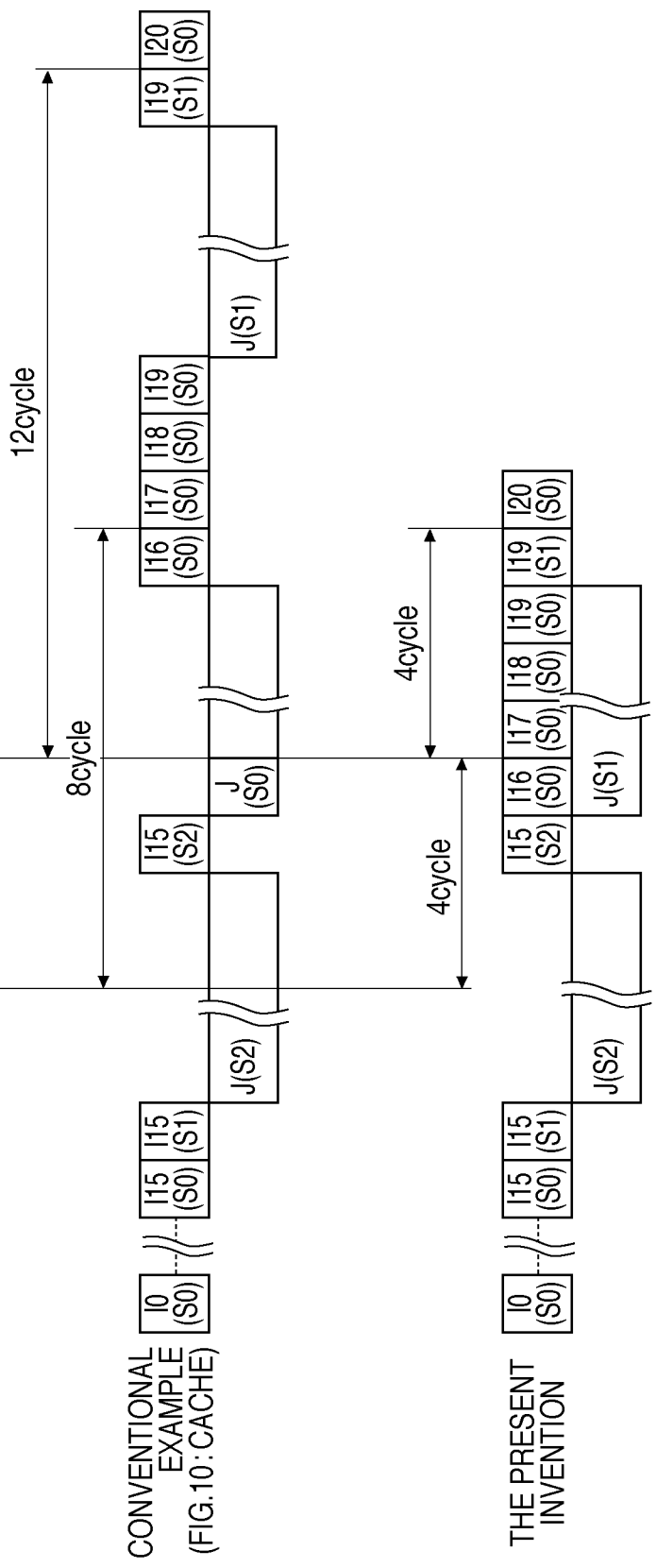

PATTERN RECOGNITION APPARATUS AND PROCESSING METHOD THEREOF

BACKGROUND OF THE INVENTION

1. Field of the Invention

The present invention relates to a pattern recognition apparatus that performs sequential pattern recognition with respect to a plurality of input data, and a processing method thereof.

2. Description of the Related Art

Technology has already been proposed for digital cameras and printers that detect a specific subject such as a person or a face in an input image, and performs processing that is suitable for the detected subject. As an example of detection of a specific subject, face detection processing that detects a human face in an image in order to perform skin color correction processing with respect to the image of the face may be mentioned.

Various methods have been proposed for face detection processing. The include a method described in P. Viola and M. Jones, "Robust Real-time Object Detection", Second International Workshop on Statistical and Computational Theories of Vision, Jul. 13, 2001 (hereunder, referred to as "Viola & Jones method"), and methods that utilize symmetrical characteristics of the human face, template matching, neural networks and the like.

Hereunder, face detection processing is described taking the Viola & Jones method as an example. According to the Viola & Jones method, recognition processing is executed based on a learning result obtained utilizing Adaboost. As shown in FIG. 1, this recognition processing is processing that, based on a result obtained by executing a certain recognition processing, outputs "True" when the next recognition processing is to be performed, or outputs "False" when the next recognition processing is not to be performed. The processing is cascade processing that ends the recognition processing when a result is "False".

In the case of face recognition, a large amount of face data is input, and results that have been learned so that a face recognition rate or a misrecognition rate reaches a certain fixed level, the number of stages at which recognition processing is to be performed, and dictionary data are determined. The term "recognition processing" refers to "pattern matching processing". Hence, the term "face detection processing" refers to a group of pattern matching processing operations that use the dictionary data. Further, the term "dictionary data" refers to parameters such as feature amounts required for pattern matching processing or threshold values used as references for determining "True" or "False".

FIG. 2 is a view that illustrates an example of a learning result with respect to face recognition. In FIG. 2, reference numeral 200 denotes input data. Reference numeral 210 denotes a feature amount that is a part of dictionary data. When a small rectangle of a portion of both eyes and a portion below both eyes (cheek portion) are compared, the feature amount indicates a feature that the portion of both eyes is darker than the portion below both eyes. Reference numeral 211 also denotes a feature amount. The feature amount 211 indicates a feature that eye parts in the portion of both eyes are blackish and a mid-forehead part that is between the two eyes is whitish compared to the eye parts.

Reference numerals 220 and 221 denote views that illustrate states in which the feature amount 210 and the feature amount 211 are actually compared with the input data 200 to perform pattern matching processing.

According to the Viola & Jones method, as shown in FIG. 3, recognition processing is broken up into given segments (stages), and "True" or "False" recognition is performed using a threshold value for each stage to perform recognition with respect to a face or a non-face part. Further, in the early stages only simple features are used so as to minimize false negatives (determining that a face is a non-face part=oversight) and relatively raise the probability of false positives (determining that a non-face part is a face=erroneous detection).

By using only simple features in this manner, since it is possible to perform recognition processing with a small number of operations, high-speed processing is enabled even when processing is performed using a processor. Further, as large a number as possible of rectangular regions can be recognized as "False" (non-face part) with good efficiency at an early stage, and face detection processing for the overall image can be completed in a short time.

FIG. 4 is a view that illustrates a conceptual configuration in a case in which the Viola & Jones method is implemented as hardware. In FIG. 4, the feature amount 210 that is dictionary data for stage 0 is stored in the recognition machine 401. A threshold value 0 that is used for determining that the result of the aforementioned stage 0 is "True" or "False" is also stored for the recognition machine 401. Hereunder, the feature amount 210 and the threshold value 0 that are required for stage 0 are referred to as "dictionary data 0". Further, the processing of stage 0 is referred to as "stage 0 processing".

As described above, the input data 200 is input to the recognition machine 401, and stage 0 processing is performed using the dictionary data 0. When the result ("True" or "False") of the stage 0 processing is "True", similarly to the recognition machine 401, the next recognition machine 402 performs pattern matching processing with respect to the input data 200 and the stage 1 processing (feature amount 211), and determination of threshold value 1. The difference between stage 0 and stage 1 is the dictionary data that is different for each stage.

FIG. 5 is a view that illustrates an example in which the conceptual hardware configuration shown in FIG. 4 is configured using a more specific circuit. In FIG. 5, a processing unit 501 includes an arithmetic unit 511 and a parameter holding unit 512.

The parameter holding unit 512 is an internal memory that holds dictionary data necessary for stage processing. For example, in the case of the recognition machine 401 that performs stage 0 processing shown in FIG. 4, the arithmetic unit 511 performs pattern matching for the input data 200 using the feature amount 210 included in dictionary data 0 that is held in the parameter holding unit 512. The stage 0 processing takes the total sum of input data with respect to rectangle 0_1 and input data with respect to rectangle 0_2 as the target pattern matching range of feature amount 210, and calculates a brightness difference between rectangle 0_1 and rectangle 0_2. When the calculated brightness difference exceeds the threshold value 0, it is assumed that the input data 200 agrees with the feature indicated by the feature amount 210, and the result that the image represented by the input data 200 is a face (Result=True) is output.

Pixel positions to be matched are indicated by the feature amount 210 included in the dictionary data 0. Consequently, arithmetic unit 511 that performs pattern matching processing computes the total sum of pixel values inside rectangles at the designated pixel positions, computes a difference between the total sums at the respective rectangles, performs a comparison operation with respect to the threshold value 210, and outputs the result of the stage 0 processing.

More specifically, the arithmetic unit 511 can be configured to perform similar operations that are stage independent in accordance with pixel positions designated by the dictionary data and a threshold value. The parameter holding unit 512 holds dictionary data for all stages or for a stage required for processing. By switching the dictionary data according to the processing stage, recognition processing can be executed for all stages. In this connection, when the parameter holding unit 512 can only hold dictionary data for one part of the processing stages, in accordance with the processing progress, the parameter holding unit 512 replaces the dictionary data of a stage for which processing has been completed with dictionary data of the stage to be processed thereafter and holds the latter data.

Recently, there is a demand for provision of recognition processing as typified by the Viola & Jones method in digital cameras and the like to realize a function that, for example, detects a face and executes focusing, and demands are also increasing with respect to implementing recognition processing in real time (at high speed).

On the other hand, because digital household electrical products such as digital cameras are extremely cost sensitive, manufacturers wish to provide recognition processing functions at the lowest possible prices, that is, there is also a demand to keep the circuit scale to a minimum.

The example shown in FIG. 5 is an implementation example that reduces the circuit scale by making the arithmetic unit 501 common for processing of all stages. In this case, the dominant factor with respect to the circuit scale is what number of stages the memory capacity of the parameter holding unit 512 is capable of holding dictionary data for.

The processing speed also differs significantly according to the number of stages the parameter holding unit 512 holds dictionary data for. For example, extremely high-speed processing can be realized by holding dictionary data for all stages in an internal memory (parameter holding unit 512) that enables high-speed access, and executing processing for each stage without replacing dictionary data.

This method is described in detail using FIG. 6. FIG. 6 is a view for describing a method that implements pattern matching processing by switching the processing for each stage.

Since a processing unit 601 that performs pattern matching processing is implemented independently of the stages, similarly to FIG. 5, only a single arithmetic unit 511 is mounted therein. Further, parameter storage units 512 to 514 can hold dictionary data, which is stage dependent, for all the stages (N stages).

Before starting processing, all of the dictionary data is loaded to the parameter holding units 512 to 514. Upon input of the input data 200, dictionary data 0 (dictionary data for stage 0) is set in the arithmetic unit 511 by the parameter switching unit 521 and stage 0 processing starts. If the result of the processing is "True", the parameter switching unit 521 switches to dictionary data 1 (dictionary data for stage 1) to enable stage 1 processing as the next stage with respect to the input data 200.

Thus, by holding dictionary data for all stages, processing can be performed without loading the required dictionary data for each stage from an external memory that has a slow access speed compared to the internal memory. Accordingly, a computational overhead is not required when loading dictionary data and high-speed processing is enabled.

The processing times in the configuration illustrated in FIG. 6 are described next using FIG. 7 and FIG. 8. FIG. 7 and FIG. 8 are views for describing processing times of pattern matching processing.

First, the terms necessary for describing the processing times will be defined. The term "pass rate" refers to the probability that a result obtained when the arithmetic unit 511 performs stage processing will be "True". The term "stage processing time" refers to a time taken for each stage processing. The term "parameter loading time" refers to a time required to load dictionary data stored in an external memory to parameter holding units 512 to 514 when switching stages.

In the following description, it is assumed that the parameter loading time is four times the stage processing time. The external memory comprises a normal DRAM, and an access time (parameter loading time) is of the order of several tens of nanoseconds to between one and two hundred nanoseconds.

In contrast, the access time of the internal memory is several nanoseconds, and since the pattern matching processing according to the Viola & Jones method is an extremely simple operation as described above, this assumption is appropriate.

In the drawings, performing stage 0 processing with respect to input data is represented by I0(S0), and loading dictionary data 0 necessary for stage 0 processing is represented by J(S0).

The example in FIG. 7 illustrates a case in which the pass rate of all stage processing is ¼, and the example in FIG. 8 illustrates a case in which the pass rate of all stage processing is ½. According to the configuration shown in FIG. 6, dictionary data (0 to N) that is necessary for processing of all the stages is being held in an internal memory, and therefore in the examples illustrated in FIG. 7 and FIG. 8 the processing is performed without stopping at all.

However, although processing is performed at high speed with the configuration illustrated in FIG. 6, there is the problem that the configuration involves an extremely high cost because it is necessary to provide a very large internal memory for holding dictionary data for all stages.

Therefore, to avoid making the parameter holding units 512 to 514 very large, as shown in FIG. 9, a configuration is generally used that includes a single small-capacity variable parameter holding unit 912, and loads only the required dictionary data from an external memory when performing each stage.

The processing unit 901 includes the arithmetic unit 911 that is stage independent, and the variable parameter holding unit 912 that is capable of rewriting data for holding dictionary data that is dependent on stage processing. The processing unit 901 executes stage processing in sequence based on image input data (Data_in) and a signal valid_in that indicates that the image input data is valid. The image input data is input via a data control unit 921 inside a control unit 902.

The arithmetic unit 911 outputs a result obtained by performing pattern matching processing using the input Data_in and the dictionary data in the variable parameter holding unit 912 as Result (valid_out). This result is detected by a detection unit 922 inside the control unit 902.

If the result (Result, valid_out) is "True", since it is necessary to perform the next stage processing for the current input data, the control unit 902 acquires dictionary data required for the next stage processing. In contrast, if the result is "False" or stage processing of the final stage has finished, since it is necessary to perform processing with respect to the next input data from the stage 0 processing that is the first stage, the control unit 902 loads (acquires) dictionary data 0. For example, when detecting a face of an unknown size from one image, pattern recognition is performed in sequence by taking respective regions cut out from the image after changing the positions and sizes as respective pieces of input data.

Thus, when it is required to switch the stage processing (acquire dictionary data), the data control unit 921 acquires dictionary data from an unshown external memory by making an input request for the required dictionary data with a parameter acquisition unit 926 via a parameter control unit 923. The acquired dictionary data is transferred to the variable parameter holding unit 912 by a parameter transfer unit 925.

After parameter transfer to the variable parameter holding unit 912 ends, a parameter switching control unit 924 notifies the arithmetic unit 911 that parameter switching is completed, and the arithmetic unit 911 can then execute the next stage processing.

Thus, the control unit 902 detects the pattern matching result from the arithmetic unit 911 and, as necessary, acquires dictionary data required for the next stage processing and transfers the dictionary data to the variable parameter holding unit 912. By instructing the arithmetic unit 911 to execute pattern matching after the transfer is completed, stage processing can be performed sequentially with respect to the input (rectangular) input data.

The processing times of the configuration shown in FIG. 9 will now be described using the aforementioned FIG. 7 and FIG. 8. The description according to "conventional example (FIG. 9)" illustrated in FIG. 7 is made on the premise that dictionary data 0 is stored in the variable parameter holding unit 912 before starting processing.

When an input image is input, "I0(S0)" processing is performed. Since the processing result is "False", processing is performed with respect to the next input data. At this time, since the dictionary data 0 for stage 0 that is required next is already stored in the variable parameter holding unit 912, the processing of "I1(S0)" and "I2(S0)" can be performed in that state. Subsequently, the result of performing I3(S0) is "True", and I3(S1) is performed after waiting for loading "J(S1)" of dictionary data 1 for stage 1. The result of I3(S1) is "False", and thereafter loading J(S0) of dictionary data 0 that is required next is performed and I4(S0) is executed.

Thus, according to the conventional example, since there is one variable parameter holding unit 912, it is necessary to load dictionary data each time stage processing is switched. Therefore, stage processing stops while dictionary data is being loaded.

More specifically, compared to the case of holding dictionary data 0 to N for all stage processing of the conventional example (FIG. 6) shown in FIG. 7, the processing is delayed by the amount of time for which the stage processing stops (i.e., the dictionary data loading time). Here, if the stage processing time is taken to be one cycle, according to the example shown in FIG. 7, it is found that until the I7(S1) processing ends, in addition to a processing time of 10 cycles, the processing is delayed by 12 cycles (=3 times×4 cycles) that are required for dictionary data loading.

Further, according to the example shown in FIG. 8, similarly to the example shown in FIG. 7, dictionary data is loaded and processing is performed each time a stage is switched, regardless of the pass rate. In this case, compared to the conventional example (FIG. 6), the processing is delayed by 20 cycles (=5 times×4 cycles) until the I4(S0) processing ends.

As described above, in the case of a configuration in which dictionary data of all stages is held in the internal memory, although the processing is fastest, the circuit scale is largest. In contrast, in the case of a configuration in which dictionary data of one stage is held in the internal memory and dictionary data required for each stage processing is loaded from an external memory, although the circuit scale is minimized, there is a noticeable reduction in the processing speed.

To overcome this problem, a cache method (a method that holds a parameter used immediately prior thereto) and a prefetch method (a method that prepares the parameter required next in advance) are widely used as conventional technology for speeding up processing while suppressing an increase in the circuit scale of an internal memory.

The cache method and prefetch method will now be described in detail. In order to implement the cache method and the prefetch method, as shown in FIG. 10, the configuration includes two of the variable parameter holding units shown in the configuration illustrated in FIG. 9, and a parameter switching unit is added that switches between the two variable parameter holding units.

FIG. 10 is a view that illustrates an example that includes a parameter switching unit that switches between two variable parameter holding units. Reference numerals 1001 and 1002 shown in FIG. 10 correspond to reference numerals 901 and 902 shown in FIG. 9, and reference numerals 1011, 1012, and 1021 to 1026 shown in FIG. 10 correspond to reference numerals 911, 912, and 921 to 926 shown in FIG. 9. According to the example shown in FIG. 10, a variable parameter holding unit 1013 and a parameter switching unit 1014 are further provided.

The processing times in the case of using the cache method and the prefetch method will now be described using FIG. 7 and FIG. 8 again.

First, processing times when using the cache method with the configuration shown in FIG. 10 are described (conventional example (FIG. 10: cache)). It is assumed that dictionary data 0 and 1 is previously held in the variable parameter holding units 1012 and 1013. In the example illustrated in FIG. 7, there is no loss in the case of the cache method while the processing proceeds only to stages 0 and 1. That is, the delay cycle=0. However, as shown in FIG. 7, when the result at I15(S1) is "True", J(S2) is necessary in order to perform the subsequent I15(S2). Since J(S2) is loaded into the place in which J(S0) is stored, J(S0) is deleted. Because the result of I15(S2) is "False", in order to perform the subsequent I16(S0), the necessity arises to reload J(S0) that was deleted earlier.

In this case, since the dictionary data remaining in the cache is dictionary data 0 and 2, the processing proceeds without delay while the stage 0 processing continues. Subsequently, the result of I19(S0) is "True", and loading J(S1) of the dictionary data 1 is necessary. As a result, a delay of eight cycles arises until I16(S0) ends, and a delay of 12 cycles arises until I19(S1) ends.

Next, in the example shown in FIG. 8, the result of I3(S1) is "True", and dictionary data 0 that is the oldest data is erased in order to execute loading J(S2) of dictionary data 2. Furthermore, the result of I3(S2) is "False", and therefore J(S0) is required again.

Hence, there is a delay of eight cycles until I4(S0) ends.

Next, processing times when using the prefetch method with the configuration shown in FIG. 10 are described (conventional example (FIG. 10: prefetch)). However, in this case it is assumed that the processing performed next after stage A processing that is currently being performed is stage A+1 processing, and an example is described of a prefetch method that prefetches parameters required for the stage A+1 processing.

Similarly to the cache method described above, two variable parameter holding units 1012 and 1013 are provided in the configuration shown in FIG. 10 and it is assumed that dictionary data 0 and 1 are held in advance. In this case, the result of I0(S0) is "True", and simultaneously to the start of the I1(S1) processing, dictionary data 0 is deleted (overwritten) in order to execute loading J(S2) of the dictionary data 2 that is assumed to be required next. When the result of I0(S1)

is "True", processing can be performed instantly using the prefetched dictionary data 2. In contrast, when the result of I0(S1) is "False", it is necessary to load J(S0) the dictionary data 0 again, and thus a penalty arises because of a parameter loading mistake that is due to a mistake regarding the assumed result with respect to the parameter to be required next.

Next, processing times are described using (conventional example: prefetch) shown in FIG. 7. In the example shown in FIG. 7, J(S2) is started as a prefetch operation at the time that I3(S1) starts. At this time, the dictionary data 0 that is the oldest data is erased.

However, when the result of I3(S1) is "False", it is necessary to execute J(S0) that is required for the pattern matching processing of the first stage with respect to the next input data. Therefore, the dictionary data 1 that is the oldest data at that time is deleted, and the dictionary data 0 is stored.

Next, at the time that the dictionary data 0 is held, the dictionary data 2 is stored in the other variable holding unit. Therefore, simultaneously to starting processing of I4(S0), loading J(S1) of dictionary data 1 that is predicted to be required for the next processing starts. In this example, there is a delay of seven cycles until I7(S1) ends compared to the conventional example (FIG. 6).

Next, in the example shown in FIG. 8, there is a delay of 19 cycles until I4(S0) ends compared to the conventional example (FIG. 6).

In the examples illustrated in both FIG. 7 and FIG. 8, it is found that an effective prefetch operation can be performed only during a period in which processing is "True" in the recognition processing. Further, as occurs in the case where the I1(S1) result is "False", the dictionary data 2 for stage 2 that is currently loaded is not necessary once the result of I1(S1) is "False". Further, since the dictionary data 0 has been erased in order to load the dictionary data 2, time is required to load the dictionary data 0 again.

More specifically, according to the prefetch method, the greater the number of times that the stage processing result is "False", the greater the increase in the number of times that dictionary data is loaded unnecessarily.

The following problems exist with the cache method and prefetch method as the prior art for speeding up processing while suppressing an increase in the circuit scale of an internal memory.

First, according to the cache method, since data is deleted by starting from the oldest data, if a result is "False" after processing of the current input data proceeds to stage processing of a number that is greater than the number of variable parameter storage units, all dictionary data must be reloaded at the time of the next input data processing. More specifically, there is the problem that there is absolutely no cache effect.

Further, according to the prefetch method, since it is not possible to predict which dictionary data will be required next, for example, loading of dictionary data 2 is performed during stage 1 processing. However, there is the problem that if the stage 1 processing is "False", not only is loading of the dictionary data 2 wasted, the dictionary data 0 that is required next has been deleted, and time is required to reload the dictionary data 0.

SUMMARY OF THE INVENTION

The present invention provides an apparatus and method that can speed up processing while suppressing an increase in the circuit scale of an internal memory in a data processing apparatus.

According to one aspect of the present invention, there is provided a pattern recognition apparatus that sequentially performs pattern recognition with respect to a plurality of input data, comprising:

a pattern matching unit that performs pattern matching of a plurality of stages that refer to respectively different parameters at each stage with respect to each of the plurality of input data in sequence from a first stage until a matching result is false;

a fixed parameter holding unit that fixedly holds a parameter that is referred to in pattern matching from a first stage until a predetermined stage among pattern matching of the plurality of stages, during pattern recognition with respect to the plurality of input data;

a variable parameter holding unit that rewritably holds a parameter that is referred to in pattern matching of a stage after the predetermined stage among pattern matching of the plurality of stages;

a switching unit that switches whether the pattern matching unit refers to a parameter from either the fixed parameter holding unit or the variable parameter holding unit; and a writing unit that, in accordance with progress of pattern matching of the plurality of stages, rewrites a parameter held in the variable parameter holding unit with an unheld parameter.

Further features of the present invention will become apparent from the following description of exemplary embodiments (with reference to the attached drawings).

BRIEF DESCRIPTION OF THE DRAWINGS

FIG. 8 is a view for describing processing times of pattern matching processing;

FIGS. 12A and 12B are views for describing processing times of a data processing apparatus according to the embodiment of the present invention; and FIG. 13 is a view that illustrates a state when processing proceeds further from the state shown in FIGS. 12A and 12B.

DESCRIPTION OF THE EMBODIMENTS

Hereunder, a best mode for implementing the invention is described in detail with reference to the drawings.

First, the configuration of a data processing apparatus that executes data processing (so-called "cascade processing") by repeatedly performing data processing with respect to input data, and determining whether or not to perform the next data processing in accordance with a result of each data processing is described.

Figure 10:
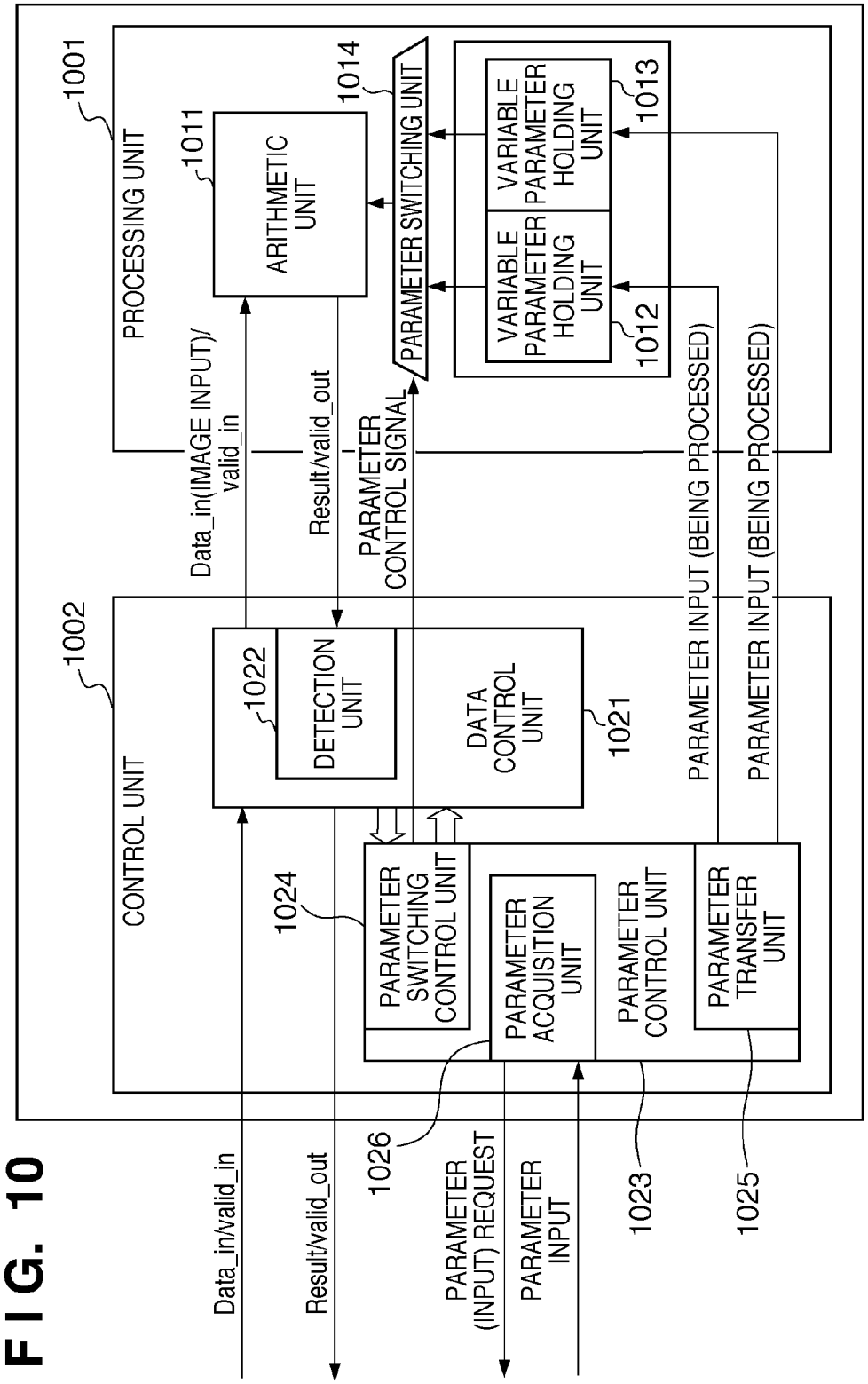
FIG. 10 is a view that illustrates an example that includes a parameter switching unit that switches between two variable parameter holding units.
Figure 11:
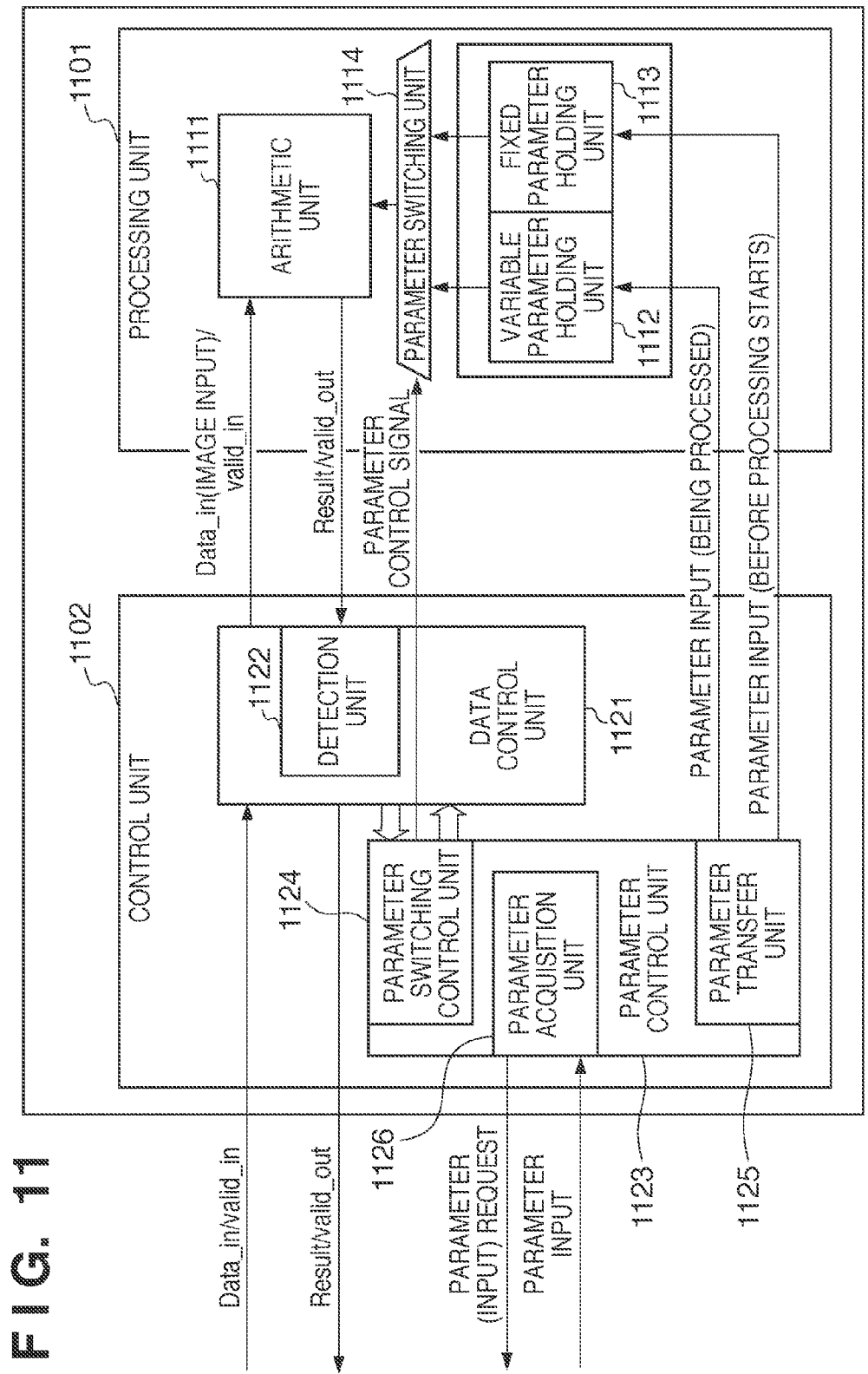
FIG. 11 is a block diagram that illustrates an example of the configuration of a data processing apparatus according to an embodiment of the present invention.

FIG. 11 is a block diagram that illustrates an example of the configuration of a data processing apparatus according to the present embodiment. As shown in FIG. 11, relative to the conventional configuration shown in FIG. 10, a processing unit 1101 includes a fixed parameter holding unit 1113. Depending on the result of an arithmetic unit 1111, a control unit 1102 switches parameters or makes a parameter (input) request, and performs recognition processing. In this case, dictionary data 0 that is required for stage 0 processing is stored in the fixed parameter holding unit 1113. Further, dictionary data required for processing of a single stage can be stored in the variable parameter holding unit 1112.

When the control unit 1102 receives input of a recognition result signal that is output by the arithmetic unit 1111 (recognition machine), the control unit 1102 detects the dictionary data that is required next. If the detection result indicates that, for example, it is necessary to refer to the dictionary data 0 stored in the fixed parameter holding unit 1113, the control unit 1102 performs an operation with the dictionary data 0 stored in the fixed parameter holding unit 1113 using the parameter switching unit 1114.

If dictionary data is required that is not stored in either the fixed parameter holding unit 1113 or the variable parameter holding unit 1112, the control unit 1102 acquires the required dictionary data by issuing a parameter (input) request and rewrites the dictionary data that is currently stored in the variable parameter holding unit 1112.

Next, the control unit 1102 of the present embodiment will be described in detail. As described above, the processing unit 1101 executes sequential stage processing with respect to rectangular image data that has been transferred thereto. The rectangular image data is input to the arithmetic unit 1111 via a data control unit 1121 inside the control unit 1102. A stage processing result from the arithmetic unit 1111 is detected with a detection unit 1122 inside the data control unit 1121.

The data control unit 1121 notifies the stage processing result that is detected by the detection unit 1122 to a parameter switching control unit 1124 of a parameter control unit 1123. When the parameter switching control unit 1124 determines that it is necessary to acquire dictionary data, the parameter switching control unit 1124 makes a request for input of the required dictionary data to outside the apparatus via the parameter control unit 1123.

At the parameter control unit 1123, the parameter acquisition unit 1126 acquires dictionary data from outside the apparatus and, if processing is underway, transfers the acquired dictionary data to the variable parameter holding unit 1112 using the parameter transfer unit 1125, to thereby rewrite the dictionary data of the variable parameter holding unit 1112. Further, before the start of processing, the parameter acquisition unit 1126 acquires the dictionary data 0 from outside the apparatus, and transfers the dictionary data 0 to the fixed parameter holding unit 1113 using the parameter transfer unit 1125. When this transfer has ended, the parameter control unit 1123 instructs the parameter switching control unit 1124 to output a parameter control signal. Thereby, switching of the parameter switching unit 1114 is performed so that the arithmetic unit 1111 can refer to parameters of the fixed parameter holding unit 1113 and the variable parameter holding unit 1112.

Thus, the control unit 1102 detects a stage processing result from the arithmetic unit 1111 and, as necessary, acquires the dictionary data that is required next and transfers the required dictionary data to the variable parameter holding unit 1112. After this transfer ends, by issuing an instruction to the parameter switching unit 1114, it is possible to perform sequential stage processing with respect to the rectangular image data that has been transferred.

Figure 7:
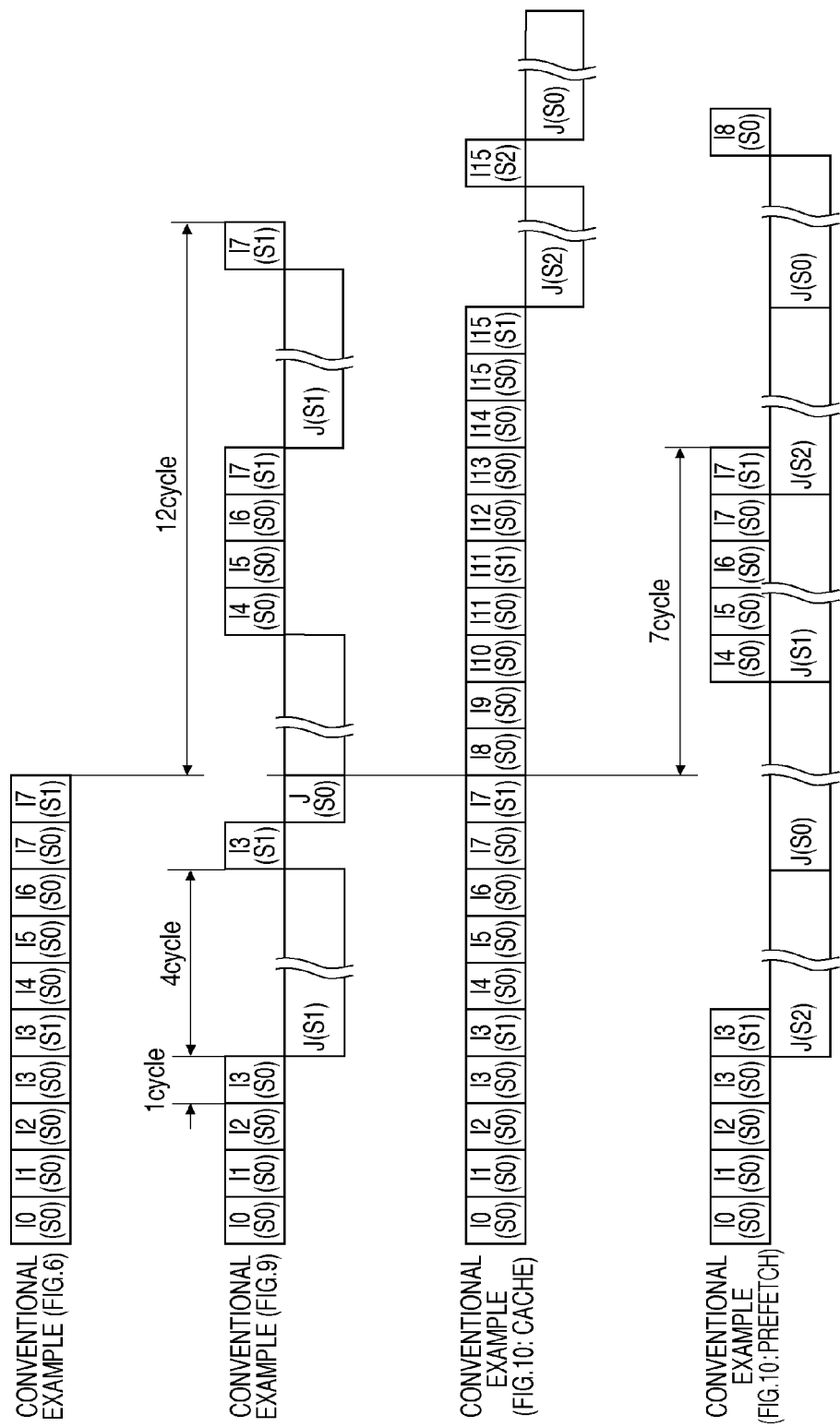
FIG. 7 is a view for describing processing times of pattern matching processing.

Next, processing times for the configuration illustrated in FIG. 11 are described using FIGS. 12A, 12B, and 13. This example is described based on the same conditions as in the aforementioned FIG. 7 and FIG. 8.

More specifically, it is assumed that the parameter loading time is four times the stage processing time. The external memory comprises a normal DRAM, and an access time (parameter loading time) is of the order of several tens of nanoseconds to between one and two hundred nanoseconds. In contrast, the access time of the internal memory is several nanoseconds, and because the pattern matching processing of the Viola & Jones method is an extremely simple operation as described above, this assumption is appropriate.

Further, in the figures, performing stage 0 processing with respect to input data is represented by I0(S0), and loading dictionary data 0 necessary for stage 0 processing is represented by J(S0).

FIGS. 12A and 12B are views for describing processing times of a data processing apparatus of the present embodiment. Example in FIG. 12A illustrates a case in which the pass rate of all stage processing is ¼. Example in FIG. 12B illustrates a case in which the pass rate of all stage processing is ½.

Figure 9:
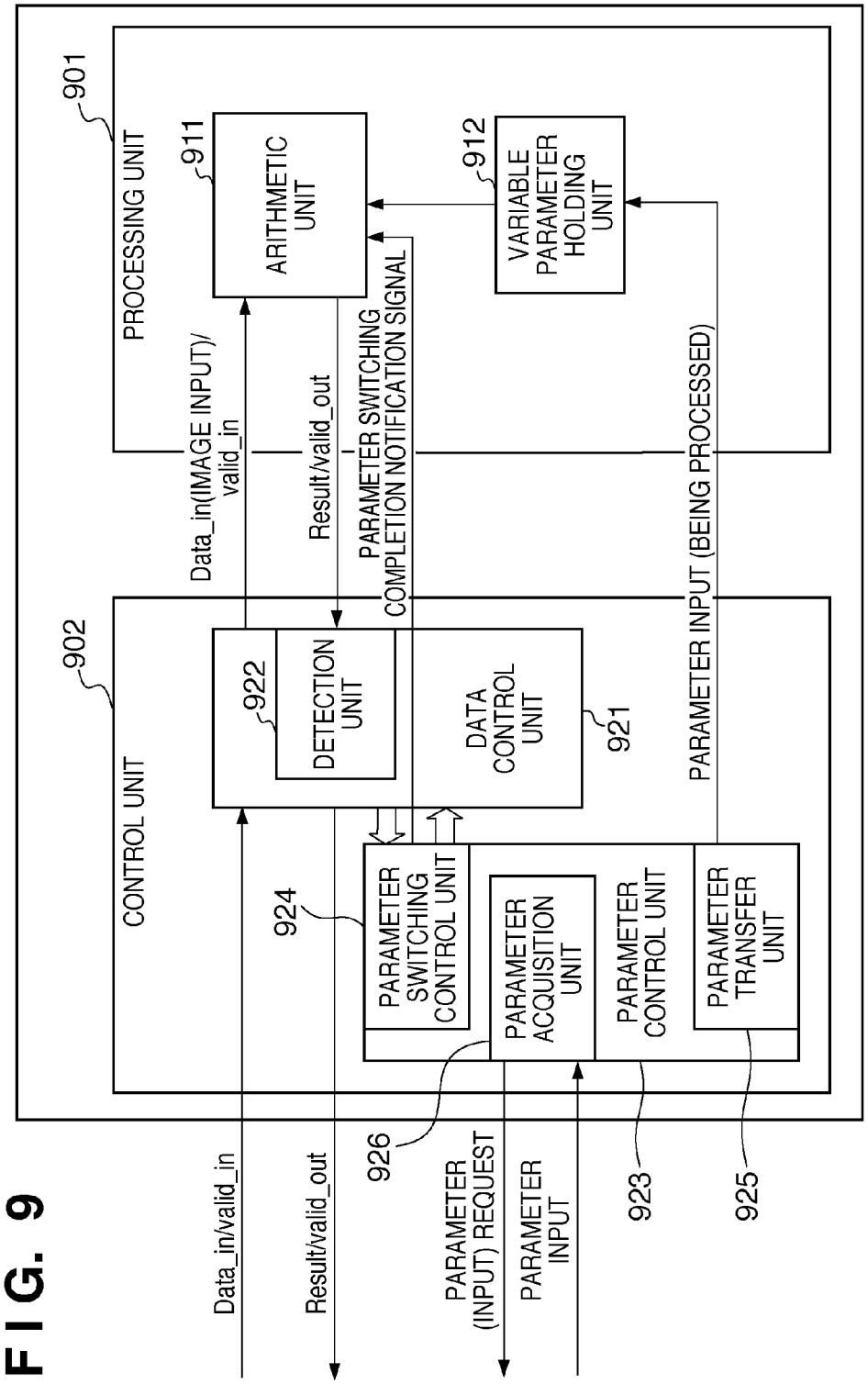
FIG. 9 is a view that illustrates the configuration of a conventional processing unit that includes a variable parameter holding unit.

At the start of processing, the dictionary data 0 for stage 0 processing is stored in the fixed parameter holding unit 1113 and the dictionary data 1 is stored in the variable parameter holding unit 1112. It is therefore possible to continue processing while the processing of stage 0 and stage 1 is being performed. That is, there is no (wasted) time in which the processing stops until I7(S1) shown in FIG. 12A, and thus the processing time is shorter than in the conventional example (prefetch method illustrated in FIG. 9 and FIG. 10) shown in FIG. 7.

Next, a state when the processing has proceeded further is described using FIG. 13. Although the processing of stage 0 and stage 1 continues without delay until I15(S1), when the result of I15(S1) is "True" it is necessary to execute J(S2) that loads the dictionary data 2 to the variable parameter holding unit 1112. When J(S2) is executed and the result of performing I15(S2) is "False", since the dictionary data 0 that is required next is constantly held in the fixed parameter holding unit 1113, the next I16(S0) is performed immediately.

Figure 1:
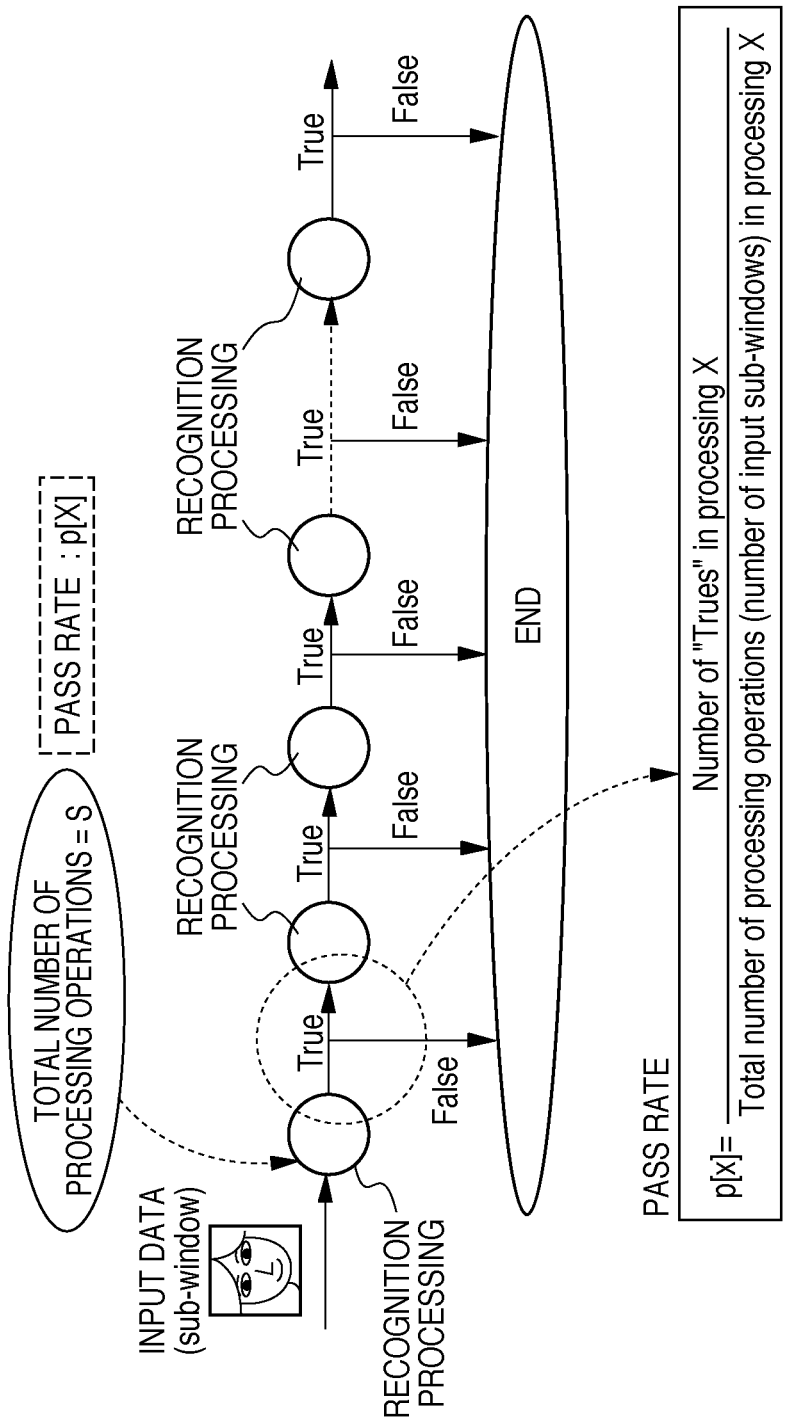
FIG. 1 is a view for describing recognition processing in face detection processing.
Figure 2:
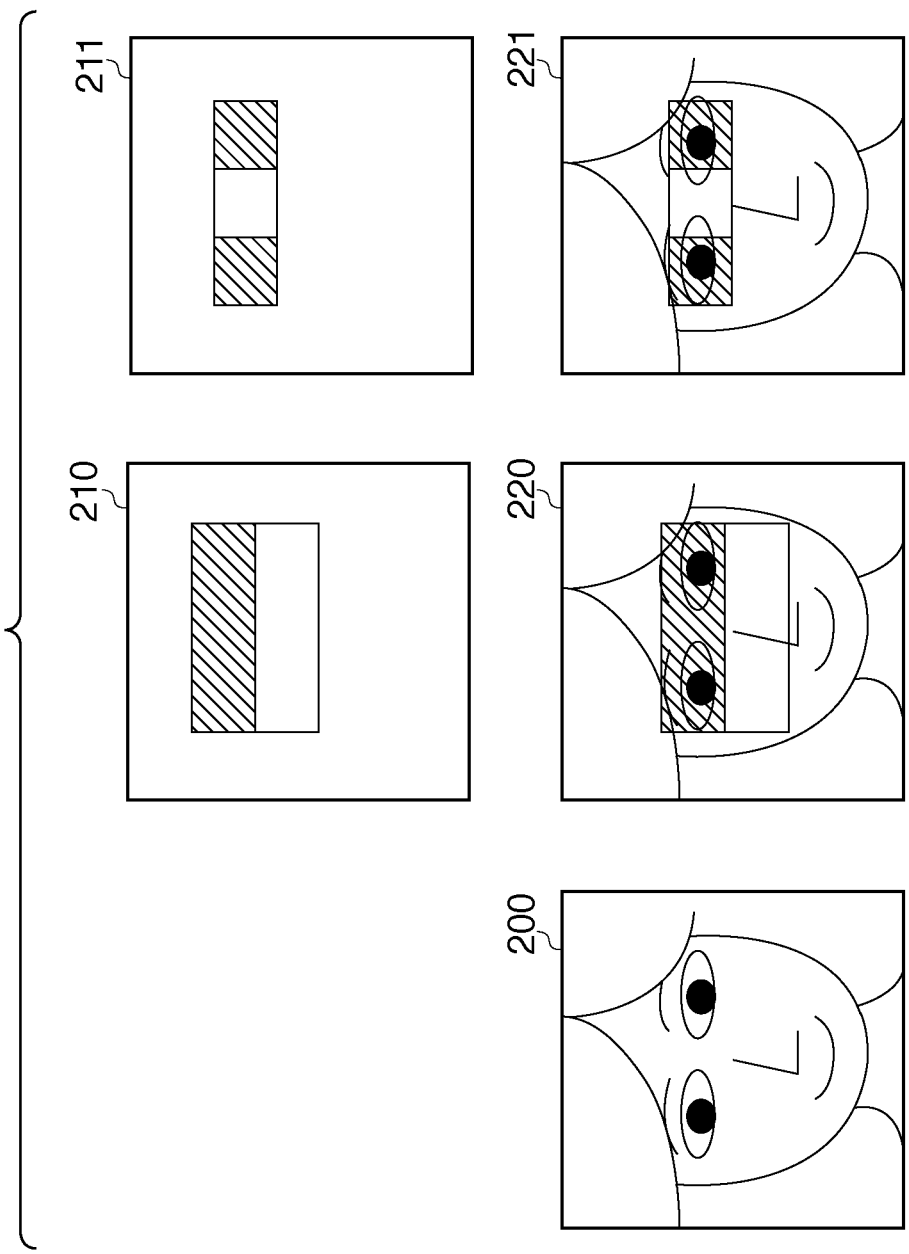
FIG. 2 is a view that illustrates an example of a learning result in face recognition.
Figure 3:
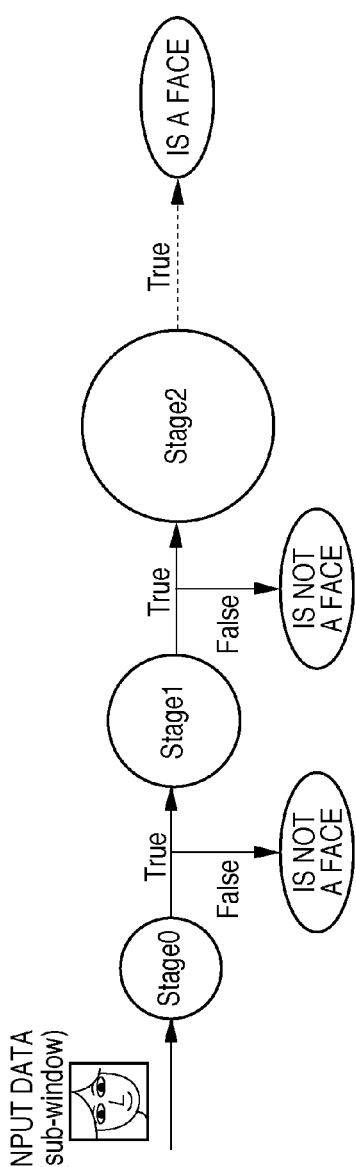
FIG. 3 is a view for describing recognition processing that performs recognition using a threshold value for each stage.
Figure 4:
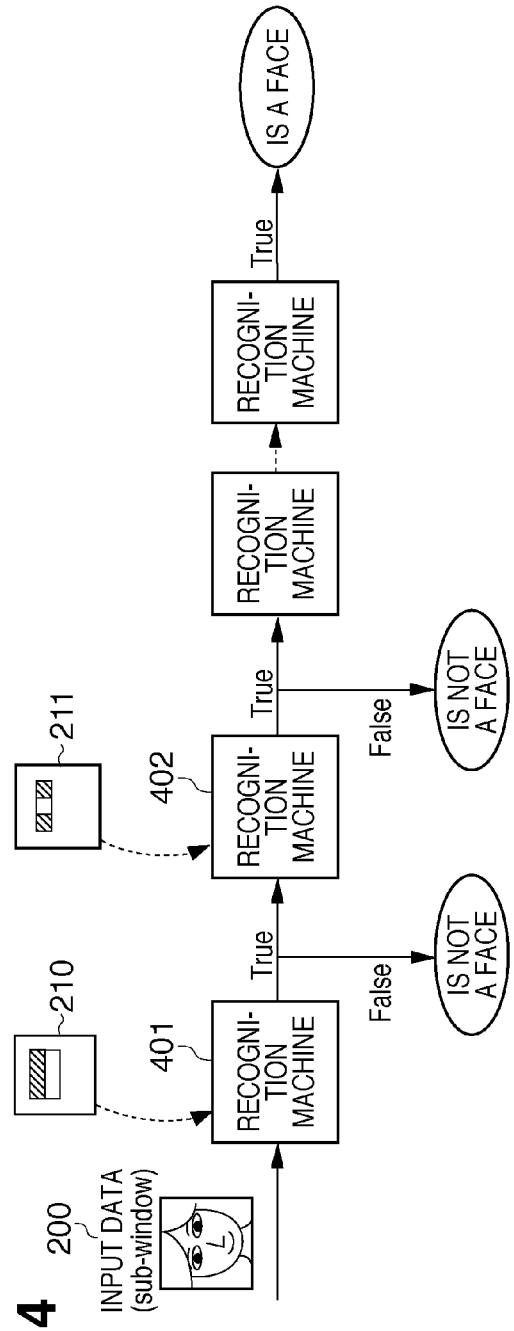
FIG. 4 is a view that illustrates a conceptual configuration in a case that implements the Viola & Jones method as hardware.
Figure 5:
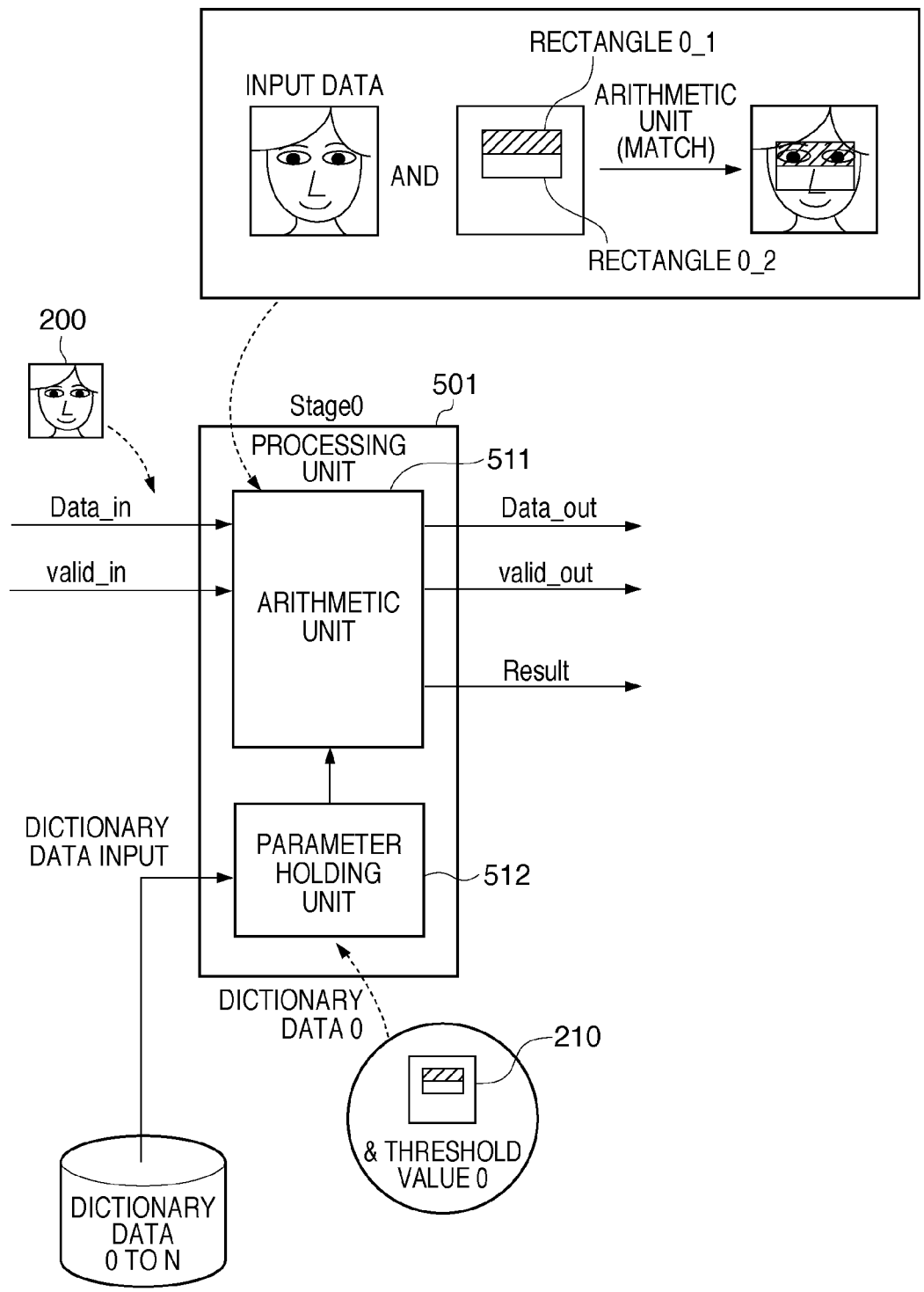
FIG. 5 is a view that illustrates an example in which the conceptual hardware configuration shown in FIG. 4 is configured with a more specific circuit.
Figure 6:
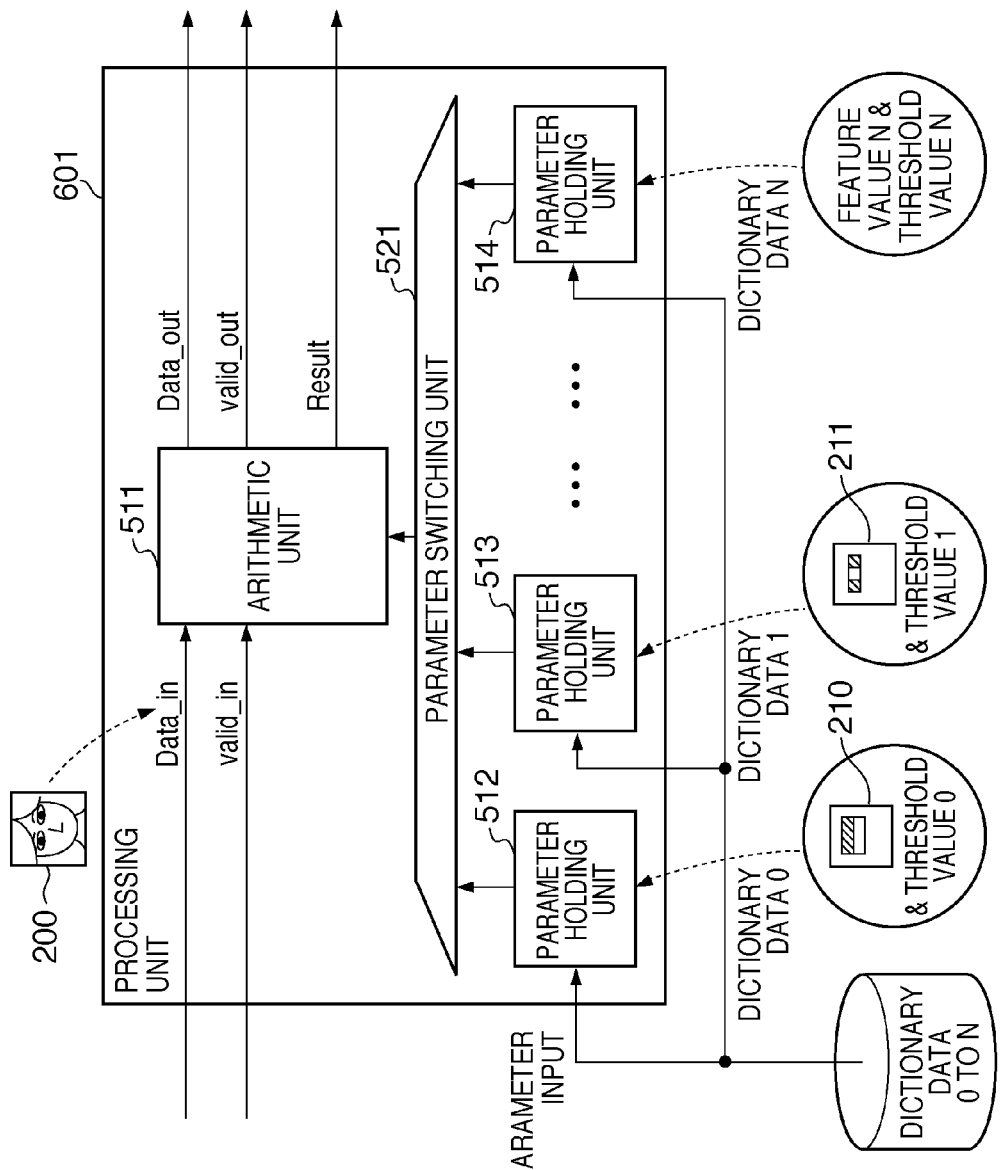
FIG. 6 is a view that illustrates the configuration of a processing unit according to a conventional example.

In this case, although according to the conventional cache method J(S0) is erased when J(S2) is performed, according to the present embodiment J(S1) is deleted and J(S0) is stored in the fixed parameter storage unit 1113, and thus I16(S0) can be processed immediately. Therefore, a delay with respect to the conventional example (FIG. 6) until I16(S0) ends is four cycles.

According to the cache method of the conventional example (FIG. 10) in which there is no delay until I15(S1), as described above, since the result of I15(S1) is "True", the dictionary data 0 that is the oldest data is deleted and the dictionary data 2 is loaded by J(S2). Therefore, compared to the conventional example (FIG. 6), a delay until I16(S0) ends is eight cycles.

More specifically, it is found that the method of the present embodiment enables faster processing. Further, according to the present embodiment, while performing stage 0 processing using the dictionary data 0 stored in the fixed parameter holding unit 1113, it is known that the dictionary data 1 will be required prior to the dictionary data 2 that is stored in the variable parameter holding unit 1112. Therefore, it is possible to perform J(S1) while processing the dictionary data. Thus, when executing the I19(S1) processing, according to this example, processing can be performed without delay and a delay time until I19(S1) is four cycles. This is faster than the cache method of the conventional example (FIG. 10) in which there is a delay of 12 cycles.

Next, variable parameter loading is described using example shown in FIG. 12B. According to this example, similarly to the example shown in FIG. 12A, as described above, processing can continue during the processing of stages 0 and 1. However, since the result of I3(S1) is "True", it is necessary to load the dictionary data 2 in the variable parameter holding unit 1112. After receiving the result of an operation from the arithmetic unit 1111, the control unit 1102 sends a request for J(S2) input, and the dictionary data 2 corresponding to this request is held in the variable parameter holding unit 1112 via the control unit 1102.

The control unit 1102 instructs the parameter switching unit 1114 to select the variable parameter holding unit 1112. After this parameter switching processing, the arithmetic unit 1111 starts I3(S2).

Next, although the result of I3(S2) is "False", since the dictionary data 0 is constantly held in the fixed parameter holding unit 1113, the processing of I4(S0) can start immediately. That is, when switching to the stage 0 processing as the first stage from pattern matching processing at a later stage, a time required for loading dictionary data can be reduced because the dictionary data 0 is constantly held in the fixed parameter holding unit 1113.

Further, since the stage 0 processing is underway, it is certain that the dictionary data that will be required next is J(S1), and since the dictionary data in the variable parameter holding unit 1112 is not being used, the dictionary data 1 can be loaded in the variable parameter holding unit 1112. That is, by means of this prefetch operation, compared to the conventional example (cache method of FIG. 9 and FIG. 10), it is possible to reduce the parameter loading time for J(S1).

Thus, in both of the cases illustrated in FIGS. 12A and 12B, the method of the present embodiment can perform processing faster than in the conventional example.

Although the fixed parameter holding unit 1113 and the variable parameter holding unit 1112 have been explicitly separated in the foregoing description, the fixed parameter holding unit 1113 and the variable parameter holding unit 1112 may be implemented by physically separating areas of the same memory.

Further, with respect to the fixed parameter holding unit 1113, in a case where there is a definite recognition target when mounting the fixed parameter holding unit 1113, a configuration may be adopted in which the fixed parameter holding unit 1113 is configured with a ROM, and the parameter used in stage 0 is held in a fixed manner therein.

In contrast, when there are a plurality of recognition targets or when a recognition target changes according to a mode or the like, it is possible to correspond to the plurality of targets or the modes by loading a parameter used in stage 0 for the relevant recognition target in the fixed parameter holding unit 1113 before starting processing.

Although a configuration is described above in which only a parameter to be used in stage 0 is held in the fixed parameter holding unit 1113, if the circuit scale allows, a configuration may be adopted so as to further hold parameters to be used up to a predetermined number of stages from stage 0, such as to also hold a parameter to be used in stage 1, in the fixed parameter holding unit 1113. Further, the variable parameter holding unit 1112 may also be configured to hold parameters to be used in a plurality of stages.

As described in the foregoing, data processing is performed in sequence from stage 0, and the processing is discontinued at a stage at which the determined result is "False". Therefore, by holding a parameter used at an initial stage for which the execution frequency is high without rewriting the parameter, and rewriting as necessary the parameters used at remaining stages for which the execution frequency is low, it is possible to speed up processing while suppressing an increase in the circuit scale.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-121349, filed May 19, 2009, which is hereby incorporated by reference herein in its entirety.

What is claimed is:

1. A pattern recognition apparatus that sequentially performs pattern recognition with respect to a plurality of input data, comprising:

a pattern matching unit that performs pattern matching of a plurality of stages that refer to respectively different parameters at each stage with respect to each of the plurality of input data in sequence from a first stage until a matching result is false;

a fixed parameter holding unit that fixedly holds a parameter that is referred to in pattern matching from the first stage until a predetermined stage among pattern matching of the plurality of stages, during pattern recognition with respect to the plurality of input data;

a variable parameter holding unit that rewritably holds a parameter that is referred to in pattern matching of a stage after the predetermined stage among pattern matching of the plurality of stages;

a selecting unit that selects one of the fixed parameter holding unit and the variable parameter holding unit as a unit for the pattern matching unit to refer to a parameter from; and a writing unit that rewrites a parameter held in the variable parameter holding unit, wherein the selecting unit selects the fixed parameter holding unit in pattern matching from the first stage to the predetermined stage or in a case where a result of a preceding stage is a false, and selects the variable parameter holding unit in pattern matching of respective stages after the predetermined stage if the result of the preceding stage is a true, and wherein the writing unit rewrites a parameter held in the variable parameter holding unit with an unheld parameter without changing the parameter being held in the fixed parameter holding unit in pattern matching of respective stages after the predetermined stage, if the result of the preceding stage is a true.

2. The apparatus according to claim 1, wherein before the pattern matching unit starts pattern recognition with respect to the plurality of input data, the writing unit writes a parameter to be referred to in pattern matching from the first stage to a predetermined stage in the fixed parameter holding unit.

3. The apparatus according to claim 1, wherein the fixed parameter holding unit holds only a parameter referred to in pattern matching of a first stage among pattern matching of the plurality of stages.

4. The apparatus according to claim 1, wherein each of the parameter held in the fixed parameter holding unit and the parameter held in the variable parameter holding unit includes a feature amount of a pattern referred to at a time of pattern matching and a threshold value for determining a pattern matching result.

5. The apparatus according to claim 1, wherein, while the pattern matching unit is executing pattern matching by referring to a parameter of the fixed parameter holding unit, the writing unit prefetches a parameter to be referred to in pattern matching thereafter in the variable parameter holding unit.

6. A processing method of a pattern recognition apparatus that sequentially performs pattern recognition with respect to a plurality of input data, comprising:

a pattern matching step of performing pattern matching of a plurality of stages that refer to respectively different parameters at each stage with respect to each of the plurality of input data in sequence from a first stage until a matching result is false;

a selecting step that selects one of a fixed parameter holding unit that fixedly holds a parameter that is referred to in pattern matching from the first stage to a predetermined stage among pattern matching of the plurality of stages during pattern recognition with respect to the plurality of input data, or a variable parameter holding unit that rewritably holds a parameter that is referred to in pattern matching of a stage after the predetermined stage among pattern matching of the plurality of stages, as a unit for the pattern matching step to refer to a parameter from; and a writing unit that rewrites a parameter held in the variable parameter holding unit, wherein the selecting step selects the fixed parameter holding unit in pattern matching from the first stage to the predetermined stage or in a case where a result of a preceding stage is a false, and selects the variable parameter holding unit in pattern matching of respective stages after the predetermined stage if the result of the preceding stage is a true, and wherein the writing step rewrites a parameter held in the variable parameter holding unit with an unheld parameter without changing the parameter being held in the fixed parameter holding unit in pattern matching of respective stages after the predetermined stage, if the result of the preceding stage is a true.

7. A non-transitory computer-readable recording medium that records a program for causing a computer to execute a processing method of a pattern recognition apparatus according to claim 6.

* * * * *